(12) United States Patent
Gretz

(10) Patent No.: US 8,076,573 B1
(45) Date of Patent: Dec. 13, 2011

(54) ELECTRICAL BOX HANGER

(75) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 246 days.

(21) Appl. No.: 12/655,514

(22) Filed: Dec. 30, 2009

(51) Int. Cl.
H02G 7/05 (2006.01)
(52) U.S. Cl. .................. 174/40 R; 174/58; 248/343
(58) Field of Classification Search ............... 174/40 R, 174/50, 58; 220/3.9; 439/535; 248/62, 343, 248/906; 362/147
See application file for complete search history.

(56) References Cited

U.S. PATENT DOCUMENTS

| 6,352,439 | B1 | 3/2002 | Stark et al. |
| 6,596,939 | B1 | 7/2003 | Gretz |
| 6,682,355 | B1 | 1/2004 | Gretz |
| 6,780,029 | B1 | 8/2004 | Gretz |
| 7,060,900 | B1 | 6/2006 | Gretz |
| 7,667,137 | B1 * | 2/2010 | Beckman ............... 174/58 |
| 7,735,794 | B1 * | 6/2010 | Gretz ................ 248/343 |
| 7,837,172 | B2 * | 11/2010 | Johnson et al. ............ 248/343 |

* cited by examiner

Primary Examiner — Dhirubhai R Patel

(57) ABSTRACT

A system for the adjustable suspension of electrical outlet, junction boxes or the like including in combination an elongated wire for attachment to an existing fixed overhead member, a wire gripper including a passageway therethrough, and a knockout engagement device that engages an opening in an electrical junction or outlet box and further includes an engagement mechanism for engaging the elongated wire as it passes from a fixed overhead member through the passageway to the engagement member and returns thereto through the passageway where it is secured by an appropriate screw, bolt or the like.

6 Claims, 3 Drawing Sheets

ELECTRICAL BOX HANGER

FIELD OF THE INVENTION

The present invention relates to devices for the installation of electrical outlet or junction boxes and more particularly to such a device useful for the suspension of electrical outlet or junction boxes from above as might be required in suspension ceiling installations and the like.

BACKGROUND OF THE INVENTION

In the installation of electrical outlet or junction boxes, there occur situations where the conventional methods of attaching such devices to fixed overhead or vertical structural members such as rafters, joists or studs is not possible as in the case of installations in suspended ceilings and the like. Accordingly, there exists a need for a system for the installation of such devices in such unusual applications. Ideally, it would be particularly desirable if such a system allowed for vertical adjustment of the location of electrical junction of outlet box relative to a fixed point above the installation point.

OBJECT OF THE INVENTION

It is therefore an object of the present invention to provide a system for the adjustable installation of electrical boxes or the like in situations where direct attachment of such devices to fixed overhead or vertical structural members such as rafters, joists or studs is not possible as in the case of installations in suspended ceilings and the like.

SUMMARY OF THE INVENTION

According to the present invention, there is provided a system for the adjustable suspension of electrical outlet, junction boxes or the like comprising in combination an elongated wire for attachment to an existing fixed overhead member, a wire gripper including a passageway therethrough, and a knockout engagement device that engages an opening in an electrical junction or outlet box and further includes an engagement mechanism for engaging the elongated wire as it passes from a fixed overhead member through the passageway to the engagement member and returns thereto through the passageway where it is secured by an appropriate screw, bolt or the like.

DETAILED DESCRIPTION

Figure 1:
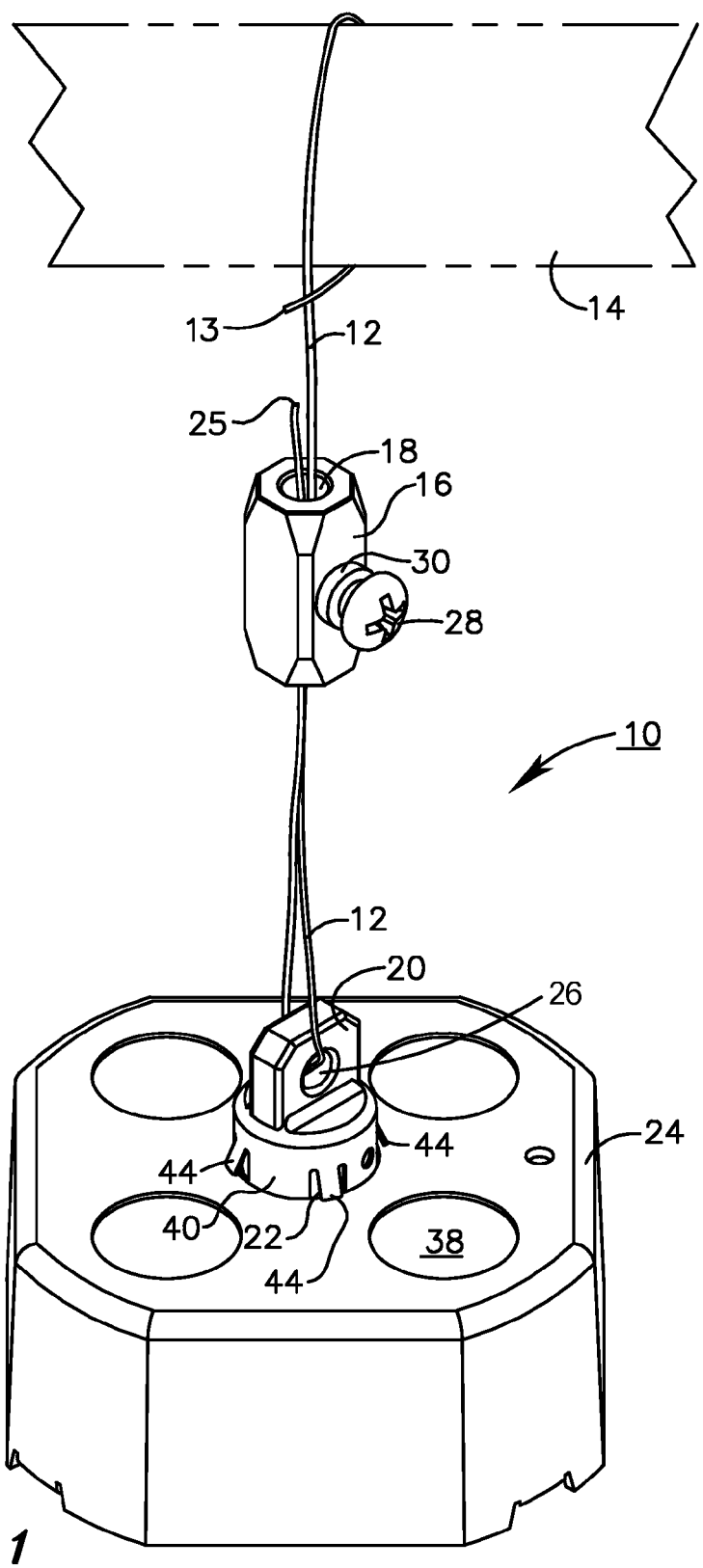
FIG. 1 is a perspective view of the electrical junction or outlet box installation system of the present invention as it is used.

Referring now to the accompanying drawings, as shown in FIG. 1, the electrical junction or outlet box suspension system or hanger 10 of the present invention comprises an elongated wire 12 having a first end 13 that is attached to a fixed overhead member 14, which is not an element of the present invention, by looping there around as shown in FIG. 1 or otherwise (for example by using an eye bolt or the like), a wire gripper 16 including a passageway 18, there through and an electrical box knockout engagement member or mechanism 20 that engages a knockout opening 22 in an outlet or junction box 24 and provides an aperture 26 thorough which second end 25 of elongated wire 12 passes and then returns to passageway 18 where elongated wire 12 can be secured by the tightening of screw or bolt 28 that engages a threaded bore or aperture 30 in wire gripper 16.

Figure 2:
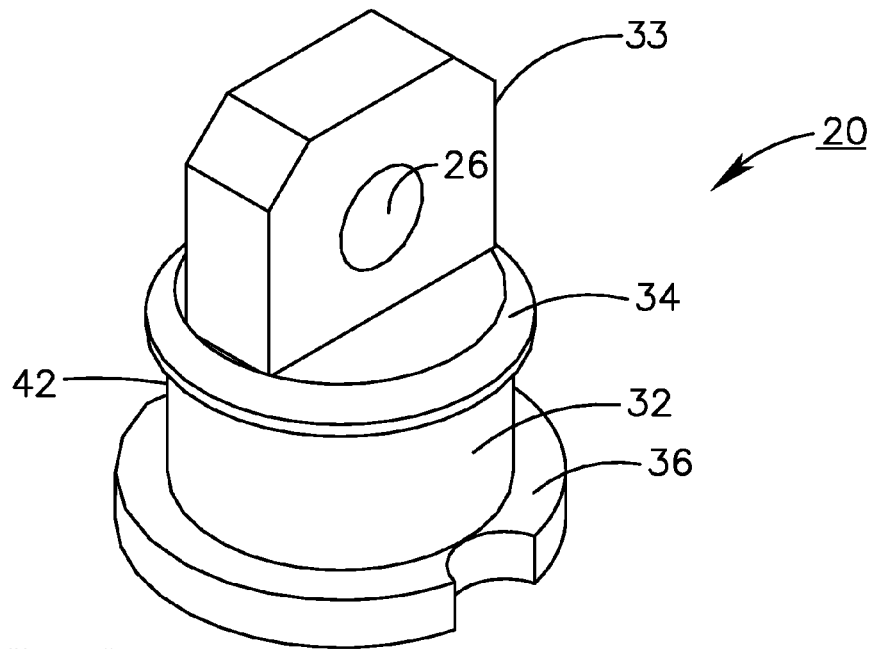
FIG. 2 is a perspective view of the wire engagement mechanism of the present invention.
Figure 3:
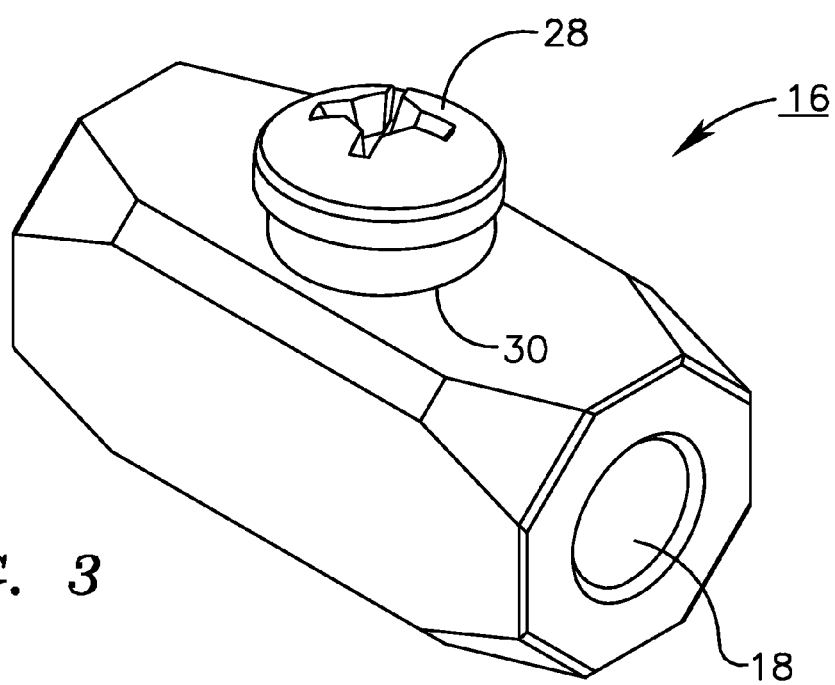
FIG. 3 is a perspective view of the wire gripper of the present invention.

According to a highly preferred embodiment of the present invention, knockout engagement mechanism 20 as shown in FIG. 2 includes a generally cylindrical body 32 having a pair of peripheral flanges including an outer peripheral flange 34 and an inner peripheral flange 36 thereabout. Peripheral flange 34 is of a size to pass through knockout aperture 22 while peripheral flange 36 is of a size to engage the periphery of knockout aperture 22 thereby preventing engagement mechanism 20 from passing through knockout aperture 22 once engagement mechanism 20 has been inserted from interior 38 of electrical junction or outlet box 24. A vertical flange 33 including aperture 26 allows for the passage of elongated wire 12 through knockout engagement mechanism 20. As will be apparent to the skilled artisan any number of other elements can be defined to provide adjustable movement of elongated wire 12 through, around or in other engagement with knockout engagement mechanism 20.

According to a further highly preferred embodiment of the present invention, knockout engagement mechanism 20 further includes a peripheral spring or snap ring 40 that engages peripheral recess 42 defined by peripheral flanges 34 and 36 about generally cylindrical body 32 and includes outwardly extending locking tangs 44 that springably engage the outer periphery of knockout aperture 22 when knockout engagement mechanism 20 is inserted through knockout aperture 22 from interior 38 as shown in FIG. 1. The structure, design and operation of snap ring 40 is discussed and described at length in U.S. Pat. No. 6,596,939 whose description is incorporated herein in its entirety to the extent relevant to the description and disclosure hereof. Other patents that describe similar snap ring locking structures include U.S. Pat. Nos. 6,352,439; 6,682,355; 6,780,029; and 7,060,900.

Figure 4:
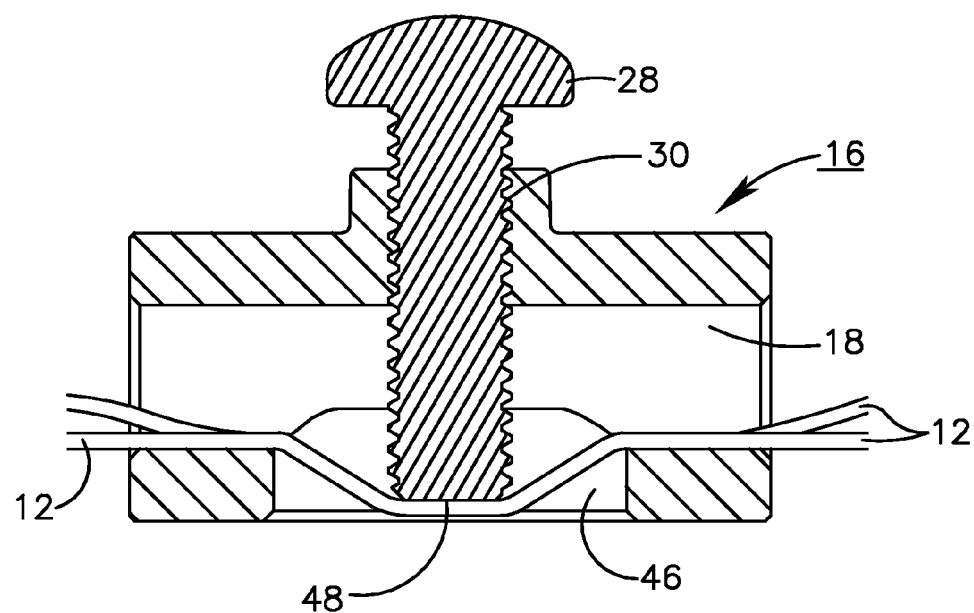
FIG. 4 is a cross-sectional view of the wire gripper of the present invention shown in the gripping position.
Figure 5:
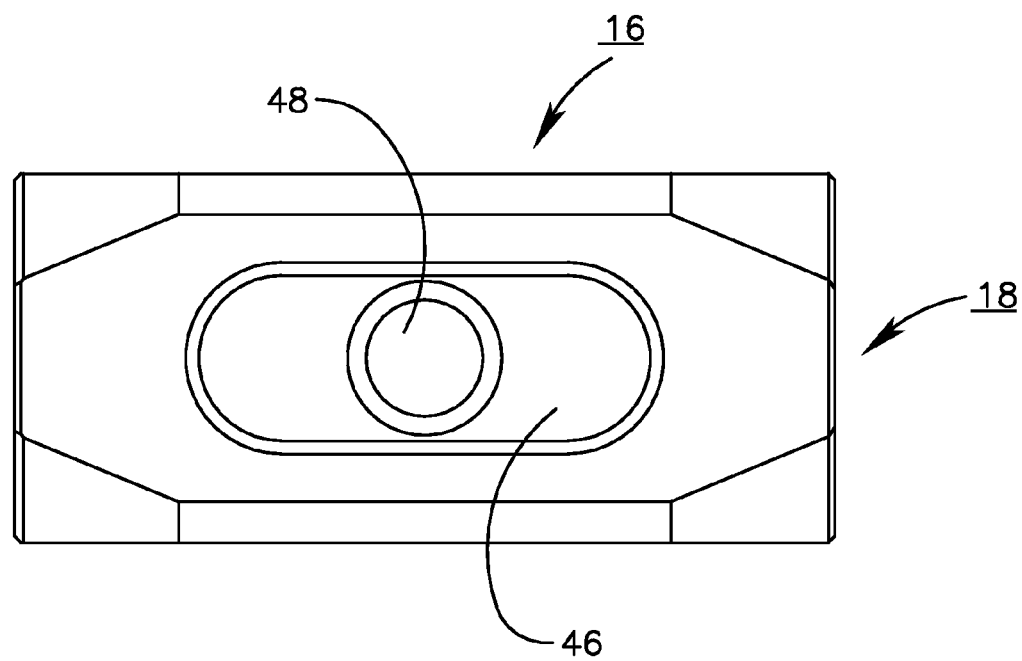
FIG. 5 is a top plan view of the wire gripper used in the present invention.

According to yet another highly preferred embodiment of the present invention, wire gripper 16 includes a rear aperture or opening 46 opposing threaded aperture 30, such that when wire 12 is inserted into passageway 18 and screw 28 tightened, extremity 48 of screw 28 deforms wire 12 into aperture 46 as shown in FIG. 4, thereby more securely retaining wire 12 in passageway 18. As shown in FIG. 4, threaded bore 30 is substantially orthogonal to passageway 18.

In use, the electrical junction or outlet box suspension system 10 of the present invention is installed by looping or otherwise attaching elongated wire 12 over/to a fixed overhead member 14, elongated wire 12 passed downward through passageway 18 and thence through aperture 26 in knockout engagement mechanism 20 which has previously been inserted through knockout aperture 22 and then back up through passageway 18. Elongated wire 12 is then adjusted to the appropriate length for the particular installation and secured in wire gripper 16 by tightening screw 28.

There has thus been described an adjustable electrical junction or outlet box suspension system useful in situations where direct attachment of such devices to fixed overhead or vertical structural members such as rafters, joists or studs is not possible as in the case of installations in suspended ceilings and the like.

As will be apparent to the skilled artisan, any number of modified means for attaching elongated wire 12 to fixed overhead member 14 can be utilized. Similarly, the particular shape or configuration of wire gripper 16 is not particularly important as long as a means is provided for adjustably passing elongated wire 12 through an aperture 18 therein and some means is provided to secure elongated wire 12 therein. Also, the particular method of attaching elongated wire 12 to knockout engagement mechanism 20 is not of particular importance so long as the length of elongated wire 12 can be vertically adjusted to meet the requirements of any particular installation.

As the invention has been described, it will be apparent to those skilled in the art that the same may be varied in many ways without departing from the spirit and scope of the invention. Any and all such modifications are intended to be included within the scope of the appended claims.

What is claimed is:

1. A hanger for the adjustable suspension of an electrical box of the type having a knockout aperture from an overhead member comprising:
    an elongated wire including a first end and a second end;
    a knockout engagement member including a vertical flange with an aperture therein and a snap ring having a locking tang thereon for insertion in said knockout aperture of said electrical box; and
    a wire gripper including a passageway there through, a threaded bore orthogonal to said passageway, and a screw in said threaded bore,
whereby said first end of said elongated wire is secured to said overhead member, said second end of said elongated wire is passed through said passageway of said wire gripper, through said aperture of said knockout engagement member, through said passageway of said wire gripper, and said screw is tightened against said elongated wire within said threaded bore of said wire gripper thereby securing said electrical box to said overhead support.

2. The hanger of claim 1 wherein said knockout engagement member includes
    a substantially cylindrical body having an outer peripheral flange and an inner peripheral flange; and
    said vertical flange extends from said outer peripheral flange.

3. The hanger of claim 2 wherein
    said outer peripheral flange is of a size to pass through said knockout aperture; and
    said inner peripheral flange is of a size to engage said electrical box at the periphery of said knockout aperture.

4. The hanger of claim 2 wherein said snap ring is disposed on said cylindrical body of said knockout engagement member and said snap ring is disposed between said outer peripheral flange and said inner peripheral flange.

5. The hanger of claim 1 wherein
    said wire gripper includes a rear opening therein opposing threaded bore; and
    said screw includes an extremity;
whereby said extremity of said screw deforms said wire into said rear opening thereby securely retaining said elongated wire in said passageway.

6. The hanger of claim 1 wherein said snap ring includes a plurality of said locking tangs.

\* \* \* \* \*